May 2, 1961  H. A. STOVER  2,982,929
VARIABLE INDUCTOR

Filed Oct. 29, 1958  2 Sheets-Sheet 1

INVENTOR.
HARRIS A. STOVER
BY Moody and Phillion
ATTORNEYS

May 2, 1961  H. A. STOVER  2,982,929
VARIABLE INDUCTOR
Filed Oct. 29, 1958  2 Sheets-Sheet 2

INVENTOR.
HARRIS A. STOVER
BY Moody and Phillips
ATTORNEYS

United States Patent Office 2,982,929
Patented May 2, 1961

2,982,929
VARIABLE INDUCTOR

Harris A. Stover, Cedar Rapids, Iowa, assignor to Collins Radio Company, Cedar Rapids, Iowa, a corporation of Iowa Filed Oct. 29, 1958, Ser. No. 770,469

12 Claims. (Cl. 336—15)

This invention relates generally to inductive means capable of being tuned over a large frequency range and more particularly to an inductive means whose inductance is variable over a large range of values.

In certain applications such as broad band receivers of various types, it is desirable to employ circuit means tunable over a large frequency range. In the past this has been accomplished, for example, by providing a plurality of tunable circuits, each tunable only over a portion of the desired frequency range. Another means comprises a conductor wound upon a first principal spool or reel; the amount of inductance varying with the amount of the conductor wound upon the spool. The unused portion of the conductor usually is stored upon a second spool.

The first prior art structure mentioned above is somewhat elaborate and rather expensive. The second type structure has proven to be advantageous in many respects but disadvantageous in other respects.

For example, the portion of the conductor stored on the second spool can be a source of difficulty. Ordinarily, it is desirable to eliminate any inductance due to the portion of the conductor wound upon the storage spool so that the only inductance present is that created by the portion of the conductor wound on the principal spool.

One means for eliminating the inductance wound upon the storage reel is to use a noninsulated conductor and to wind said noninsulated conductor upon a storage reel of conductive material. Such an arrangement necessitates winding the noninsulated wire in a helical manner upon a principal reel of an insulative material.

As can be seen readily, the resultant structure is bulky, expensive, and conducive to considerable stray capacitance between the turns on the principal reel; which capacitance increases as the number of turns increases.

Another means for eliminating the impedance of the portion of the conductor wound upon the storage reel is to employ an insulated conductor wound upon itself in a spiral manner between the closely spaced retaining walls of the reel. Said reel is composed of a conductive material, thus producing a virtual short circuit between the turns of the conductor wound thereon at high frequencies. As can be perceived, however, the effectiveness of this method of impedance elimination decreases as the frequency decreases.

An object of the present invention is to provide an effective means for eliminating reactance from the portion of the conductor wound on the storage reel.

Another purpose of the invention is to provide an inductor variable over a large range of values.

Another object of the invention is to provide a simple and reliable variable inductor of the spirally wound type in which the surplus conductor wound on the storage reel introduces no appreciable reactance into the circuit.

Another aim of the invention is to improve spirally wound inductors generally.

In accordance with the invention there is provided a principal spool and a storage spool, and an insulated conductor having portions windable both on said principal spool and on said storage spool, from either end of the conductor. The portion of the conductor wound on the storage spool is shorted to itself at the completion of one or a few turns thereof, thus providing a shorted secondary winding of a transformer, the primary of which comprises the remaining turns on said storage spool. In accordance with transformer principles, the over-all impedance of the conductor wound on the storage spool will be, therefore, in effect, a short circuit, thus eliminating the impedance of the portion of the conductor wound upon the storage reel. Means comprising slip rings and brushes are provided for connecting the two ends of the insulated conductor to fixed terminals.

In accordance with a feature of the invention, the conductor is comprised of a flat, thin strip of insulated metal. Such a configuration, when wound spirally upon itself with the first turn shorted upon itself, will result in low magnetic flux leakage since there is little space through which the flux can leak. Consequently, there will be produced, on said storage reel, a more completely short circuited transformer than in the case of a helically wound coil. To decrease further any remaining impedance in the conductor wound on the storage reel, said storage spool preferably should be of a high conductive material whereby it (the storage reel) also will act as shorted secondary of the transformer.

Additionally the use of a thin flat strip conductor will result in a more compact structure and also a more durable structure than wire of circular cross section since the fatigue limit of a thin flat strip conductor is considerably greater than a conductor of equal current carrying capacity having a circular cross section.

These and other objects of the invention will be more fully understood from the following detailed description thereof when read in conjunction with the drawings in which.

It is to be noted that in the various figures described herein corresponding elements will be designated by similar reference characters, successively primed in succeeding figures.

Figure 1:
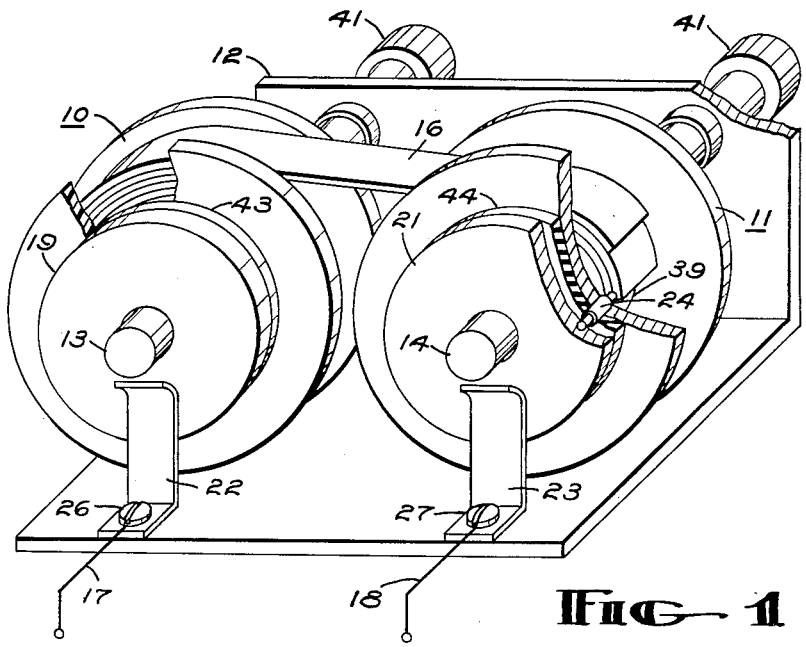
Fig. 1 is a perspective view of the invention with portions broken away.

Referring now to Fig. 1, the reels or spoollike elements 10 and 11 are mounted securely on shafts 13 and 14 respectively; said shafts 13 and 14 being rotatably mounted in a suitable supporting structure 12. The reel 10 and the portion of the foil or flat strip conductor 16 wound thereon comprise the variable inductor of the invention. The composition of the principal reel 10 is determined somewhat by the inductance range desired. In most applications a magnetic insulative material such as powdered iron or ferrites is suitable although in other applications plastic would be more desirable. Reel 11 is the storage reel and the portion of the flap strip conductor 16 not being employed as an inductor is stored thereon. Composition-wise, reel 11 preferably is of a conductive material whereby it will act as a shorted secondary to the portion of the conductor wound thereon, thus tending to eliminate any impedance in said portion of the conductor. However, almost any material, having suitable physical properties, can be employed with favorable results. More specifically, magnetic conductors, and magnetic and nonmagnetic insulators may be used.

The input terminals of the inductive device shown in Fig. 1 are the ends of the conductor 16. However, since such ends are, of necessity, rotated from time to time with the reel in order to vary the inductance of the device, slip rings 19 and 21 and brushes 22 and 23 are employed to connect electrically the ends of the conductor 16 to the lead terminals 17 and 18. A portion of the reel 11 is broken away to disclose an insulated connector 24 which connects the slip ring 21 to the end of the conductor 16. A similar connector (not shown) connects the other end of conductor 16 to the slip ring 19 through the wall of reel 10. It is to be noted that although the connector 24 is insulated to avoid contact with the reel 11, such insulation is not essential. Insulative discs 43 and 44 insulate reels 10 and 11 respectively from slip rings 19 and 21. The brushes 22 and 23 are mounted on supporting structure 12 by means of terminal bolts 26 and 27.

Rotation of the reels 10 and 11 to apportion the amount of conductor 16 wound on each reel can be accomplished by some suitable means such as control knobs 41 which are secured to the reel supporting shafts 13 and 14.

Figure 2:
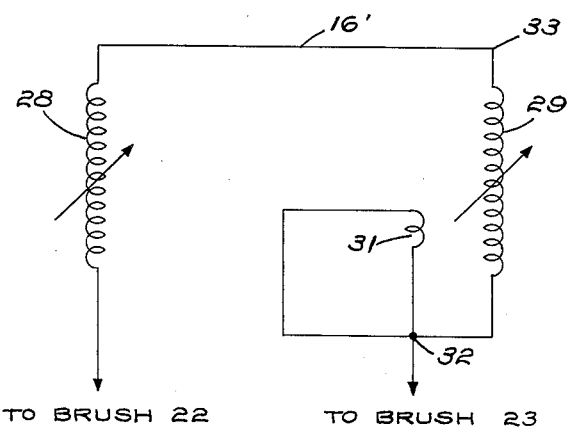
Fig. 2 shows schematically the electrical circuit of the invention.

In Fig. 2 the portion of the conductor 16' wound upon the principal reel 10 (Fig. 1) is represented by the winding 28 and the portion of the conductor 16 wound upon the storage reel 11 (Fig. 1) is represented by the winding 29 and the winding 31. The winding 31 and the winding 29 are actually a continuous winding of the conductor 16' around the storage reel 11 except that the conductor 16' is shorted upon itself at the completion of the first few turns around the reel 11. Such shorting upon itself results in the creation of a transformer on storage reel 11, as discussed hereinbefore, with the shorted winding 31 comprising the secondary and the remaining winding 29 comprising the primary. In accordance with well-known transformer principles the impedance between points 33 and 32 of Fig. 2 then becomes zero except for the effects of magnetic flux leakage in the transformer. Such flux leakage is quite small due to the extreme compactness of the spirally wound foil conductor 16.

Figure 3:
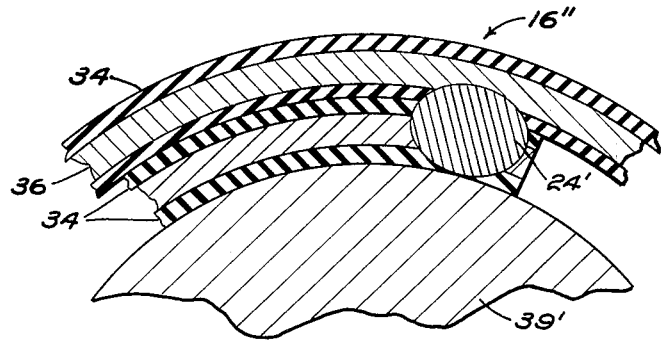
Fig. 3 is an enlarged view showing the construction of the insulated conductor and the manner in which it is short circuited upon itself.

In Fig. 3 there is shown an enlarged view of a portion of the first few turns of the conductor 16" upon the center portion 39' of the reel 11 (Fig. 1). The conductor strip 16" is composed of a metallic strip 36 covered with insulative coating 34. More specifically, the metal strip 36 can be copper foil, .00025 inch thick for example, with a coating of suitable insulation of about the same thickness. Due to the thinness of the copper foil and the insulative coatings, the conductor 16" can be rolled on and off the reels 10 and 11 (Fig. 1) indefinitely without exceeding the fatigue point.

Further, due to the over-all thinness of the conductor 16" (less than .001"), it is possible to wind many turns on a reel in a small space. For example, 250 turns will have a total thickness of less than one quarter inch. However, with a total of 250 turns, it is possible to change the resonant frequency of a tuned circuit employing the structure of Fig. 1 from 200 kc., for example, to 2000 kc., merely by changing the number of turns on reel 10 from 250 to about 25. The above stated relationship between resonant frequency and number of turns is based on the relationships that inductance is approximately proportional to the square of the number of turns, and that resonant frequency is inversely proportional to the square root of the inductance. Therefore, resonant frequency is approximately inversely proportional to the number of turns.

In Fig. 3 it can be seen that the connector pin 24' not only connects to the end of the conductor 16" but also functions to short the first turn of the conductor upon itself to form the transformer described.

Figure 4:
Fig. 4 shows a cross section of a suitable flat strip conductor.

Fig. 4 shows a cross sectional view of the flat strip conductor of Fig. 3.

Figure 5:
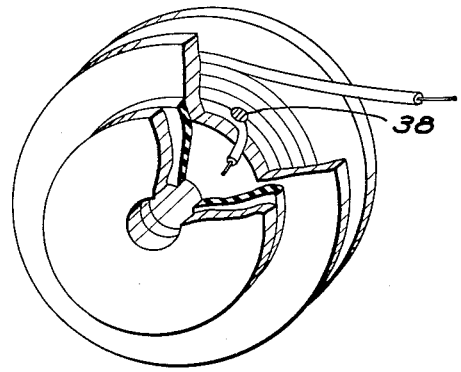
Fig. 5 shows the use of a conductor having a circular cross section.

Referring now to Fig. 5 there is shown an alternative form of conductor which can be employed in the invention. Specifically a conventional conductor of circular cross section can be used. It must be insulated as in the case of the flat strip conductor of Fig. 1. The shorting of the first turn upon itself may be accomplished by removing a small area of insulation from each turn and then soldering the two turns together as at junction 38. The advantages of employing a conductor of circular cross section area lie chiefly in applications where a thinner reel is desirable.

It is to be noted that the above described forms of the invention are but preferred embodiments thereof and that various changes may be made in the physical arrangement thereof without departing from the spirit or scope of the invention.

I claim:
1. Variable inductive means comprising supporting structure, first spoollike means mounted on said supporting structure, second spoollike means mounted on said supporting structure, an insulated conductor being arranged to be wound upon itself from points near both ends thereof upon said first and second spoollike elements, means for shorting said insulated conductor upon itself a predetermined distance from one of the ends thereof, and means for rotating said first and second spoollike elements to wind said insulated conductor on said first and second spoollike elements in selectable proportions.

2. Variable inductive means in accordance with claim 1 in which said first spoollike means is of a magnetic material.

3. Variable inductive means in accordance with claim 1 in which said first spoollike means is of an insulative material.

4. Variable inductive means in accordance with claim 1 in which said second spoollike means is of a conductive material.

5. Variable inductive means in accordance with claim 1 in which said second spoollike element is of a magnetic material.

6. Variable inductive means in accordance with claim 1 comprising slip ring means, brush means for electrically making connection to the ends of said insulated conductor.

7. Variable inductive means comprising supporting structure, first spoollike means mounted on said supporting structure, second spoollike means mounted on said supporting structure, a flat, flexible strip of conductive material, an insulation coating on both major surfaces of said strip of conductive material, said strip of conductive material being arranged to be wound upon itself from points near both ends thereof upon said first and second spoollike means, means for shorting said strip of conductive material upon itself a predetermined distance from one of the ends thereof, and means for rotating said first and second spoollike means to wind said strip of conductive material thereon in selectable proportions.

8. Variable inductive means in accordance with claim 7 in which said first spoollike means is of a magnetic material.

9. Variable inductive means in accordance with claim 7 in which said first spoollike means is of an insulative material.

10. Variable inductive means in accordance with claim 7 in which said second spoollike means is of a conductive material.

11. Varable inductive means in accordance with claim 7 in which said second spoollike means is of a magnetic material.

12. Variable inductive means in accordance with claim 7 comprising slip ring means and brush means for electrically making connection to the ends of said strip of conductive material.

References Cited in the file of this patent

UNITED STATES PATENTS

| | | |
|---|---|---|
| 862,361 | Thompson | Aug. 6, 1907 |
| 1,555,509 | Marrec | Sept. 29, 1925 |
| 2,666,905 | Gerlach | Jan. 19, 1934 |